US011905743B2

(12) United States Patent
Salter et al.

(10) Patent No.: US 11,905,743 B2
(45) Date of Patent: Feb. 20, 2024

(54) VEHICLE COMPARTMENT HAVING SPEED-BASED LATCH CONTROL

(71) Applicant: Ford Global Technologies, LLC, Dearborn, MI (US)

(72) Inventors: Stuart C. Salter, White Lake, MI (US); Annette Lynn Huebner, White Lake, MI (US); Kristin Ann Hellman, Walled Lake, MI (US); Paul Kenneth Dellock, Northville, MI (US); Peter Phung, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 773 days.

(21) Appl. No.: 16/734,753

(22) Filed: Jan. 6, 2020

(65) Prior Publication Data

US 2021/0207409 A1 Jul. 8, 2021

(51) Int. Cl.

*E05B 77/54* (2014.01)
*E05B 83/26* (2014.01)
*E05B 81/76* (2014.01)
*E05B 81/56* (2014.01)

(52) U.S. Cl.

CPC .............. *E05B 77/54* (2013.01); *E05B 81/56* (2013.01); *E05B 81/76* (2013.01); *E05B 83/26* (2013.01)

(58) Field of Classification Search

CPC ........................................................ E05B 77/54
See application file for complete search history.

(56) References Cited

U.S. PATENT DOCUMENTS 5,859,479 A * 1/1999 David ....................... B60Q 1/52 340/471
6,018,292 A 1/2000 Penny, Jr.
6,091,322 A * 7/2000 Ang .......................... B60Q 3/30 340/425.5
6,130,614 A 10/2000 Miller et al.
6,209,933 B1 * 4/2001 Ang .......................... B60Q 3/30 292/DIG. 43
6,222,442 B1 4/2001 Gager et al.
6,335,687 B1 1/2002 Terashima et al.
(Continued)

FOREIGN PATENT DOCUMENTS

WO WO-9904119 A1 * 1/1999 ............. E05B 83/26

*Primary Examiner* — Alyson M Merlino
(74) *Attorney, Agent, or Firm* — Vichit Chea; Price Heneveld LLP

(57) ABSTRACT

A vehicle includes a storage compartment having a door panel movable between closed and open positions allowing access to the storage compartment, a user input device located within the storage compartment, and a latch assembly for latching the door panel in the closed position. The latch assembly includes a first release stage in the closed position allowing the door panel to move to an intermediate position between the open and closed positions and a second release stage allowing the door panel to move to the open position. The vehicle also includes a vehicle speed sensor sensing vehicle speed and a controller monitoring the sensed vehicle speed and detecting a user input to the user input device and controlling the latch assembly to selectively allow the door panel to move to one of the intermediate and open positions based on the sensed vehicle speed and the detected user input.

18 Claims, 5 Drawing Sheets

(56) References Cited

U.S. PATENT DOCUMENTS

| | | | | |
|---|---|---|---|---|
| 6,390,529 | B1 * | 5/2002 | Bingle | E05B 83/26<br>292/DIG. 43 |
| 6,762,676 | B2 * | 7/2004 | Teowee | B60R 25/1004<br>250/342 |
| 6,812,830 | B2 * | 11/2004 | Faye | E05B 83/26<br>340/573.4 |
| 7,109,853 | B1 * | 9/2006 | Mattson | E05B 83/26<br>236/94 |
| 8,935,053 | B2 * | 1/2015 | Wheeler | E05B 83/24<br>361/170 |
| 9,284,757 | B2 * | 3/2016 | Kempel | E05B 83/26 |
| 11,414,904 | B2 * | 8/2022 | Klein | E05B 83/26 |
| 11,421,455 | B2 * | 8/2022 | Perkins | E05B 83/26 |
| 2002/0109588 | A1 * | 8/2002 | Faye | E05B 83/26<br>340/425.5 |
| 2013/0238187 | A1 | 9/2013 | Zysk | |
| 2014/0088826 | A1 * | 3/2014 | Wheeler | E05B 83/24<br>701/36 |
| 2014/0319848 | A1 * | 10/2014 | Fannon | E05B 83/24<br>292/122 |
| 2016/0168883 | A1 * | 6/2016 | Konchan | E05B 83/24<br>292/200 |
| 2022/0162887 | A1 * | 5/2022 | Page | E05B 83/24 |

* cited by examiner

VEHICLE COMPARTMENT HAVING SPEED-BASED LATCH CONTROL

FIELD OF THE INVENTION

The present invention generally relates to vehicle storage compartments, and more particularly relates to a storage compartment having a door panel that may be released or opened by an occupant input located within the storage compartment.

BACKGROUND OF THE INVENTION

Motor vehicles are commonly equipped with a trunk door panel covering a rear storage compartment, referred to as a trunk, at the rear side of the vehicle and a hood door panel covering an engine compartment at the front side of the vehicle. Vehicles having internal combustion engines typically contain the engine within the engine compartment at the front of the vehicle. Electric vehicles employ motors that are typically much smaller than internal combustion engines and, as a result, allow for the engine compartment to be utilized as a storage compartment at the front of the vehicle. Similar to the trunk, an occupant may be trapped within the front storage compartment. It may be desirable to provide for an arrangement for occupants to exit the storage compartment(s).

SUMMARY OF THE INVENTION

According to a first aspect of the present invention, a vehicle is provided. The vehicle includes a storage compartment having a door panel that is movable between a closed position and an open position allowing access to the storage compartment, a user input device located within the storage compartment, and a latch assembly for latching the door panel in the closed position, wherein the latch assembly includes a first release stage in the closed position for allowing the door panel to move to an intermediate position between the open position and closed position and a second release stage for allowing the door panel to move to the open position. The vehicle also includes a vehicle speed sensor for sensing vehicle speed, and a controller monitoring vehicle speed and detecting a user input to the user input device and controlling the latch assembly to selectively allow the door panel to move to one of the intermediate and open positions based on the sensed vehicle speed and the detected user input.

Embodiments of the first aspect of the invention can include any one or a combination of the following features:

- the user input device comprises a switch;
- the switch comprises a capacitive switch;
- the latch assembly comprises a two-stage latch that is electronically controlled by the controller;
- the two-stage latch fully releases the door panel to the open position in a first latch position and releases and maintains the door panel in a partially open position in an intermediate second latch position and holds the door panel in the fully closed position in a third latch position;
- the storage compartment is located on the front side of the vehicle;
- the vehicle comprises an electric vehicle;
- a device for providing a warning to a driver of the vehicle when the input device is activated; and
- the door panel comprises a hood panel on a front side of the vehicle.

According to a second aspect of the present invention, a vehicle is provided. The vehicle includes a storage compartment having a hood panel on a front side of the vehicle that is movable between a closed position and an open position allowing access to the storage compartment, a user input device located within the storage compartment, and a latch assembly for latching the hood panel in the closed position, wherein the latch assembly includes a first release stage in the closed position for allowing the hood panel to move to an intermediate position between the open position and closed position and a second release stage for allowing the hood panel to move to the open position. The vehicle also includes a vehicle speed sensor for sensing vehicle speed, and a controller monitoring vehicle speed and detecting a user input to the user input device and controlling the latch assembly to selectively allow the hood panel to move to one of the intermediate and open positions based on the sensed vehicle speed and the detected user input.

Embodiments of the second aspect of the invention can include any one or a combination of the following features:

- the user input device comprises a switch;
- the switch comprises a capacitive switch;
- the latch assembly comprises a two-stage latch that is electronically controlled by the controller;
- the two-stage latch fully releases the hood panel to the open position in a first latch position and releases and maintains the hood panel in a partially open position in an intermediate second latch position and holds the hood panel in the fully closed position in a third latch position;
- the storage compartment is located on the front side of the vehicle;
- the vehicle comprises an electric vehicle; and
- a device for providing a warning to a driver of the vehicle when the input device is activated.

According to a third aspect of the present invention, a method of controlling a door panel for a storage compartment on a vehicle. The method includes the steps of providing the storage compartment having the door panel being movable between a closed position and an open position allowing access to the storage compartment, detecting a user input to a user input device located within the storage compartment, and latching the door panel in the closed position with a latch, wherein the latch includes a first release state in the closed position for allowing the door panel to move to an intermediate position between the open position and the closed position and a second release stage for allowing the door panel to move to the open position. The method also includes the steps of sensing vehicle speed with a vehicle speed sensor, and controlling the latch to selectively allow the door panel to move to one of the intermediate and open positions based on the sensed vehicle speed and the detected user input.

Embodiments of the third aspect of the invention can include any one or a combination of the following features:

- the storage compartment is located at a front of the vehicle and the door panel is a hood panel; and
- the vehicle comprises an electric vehicle.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
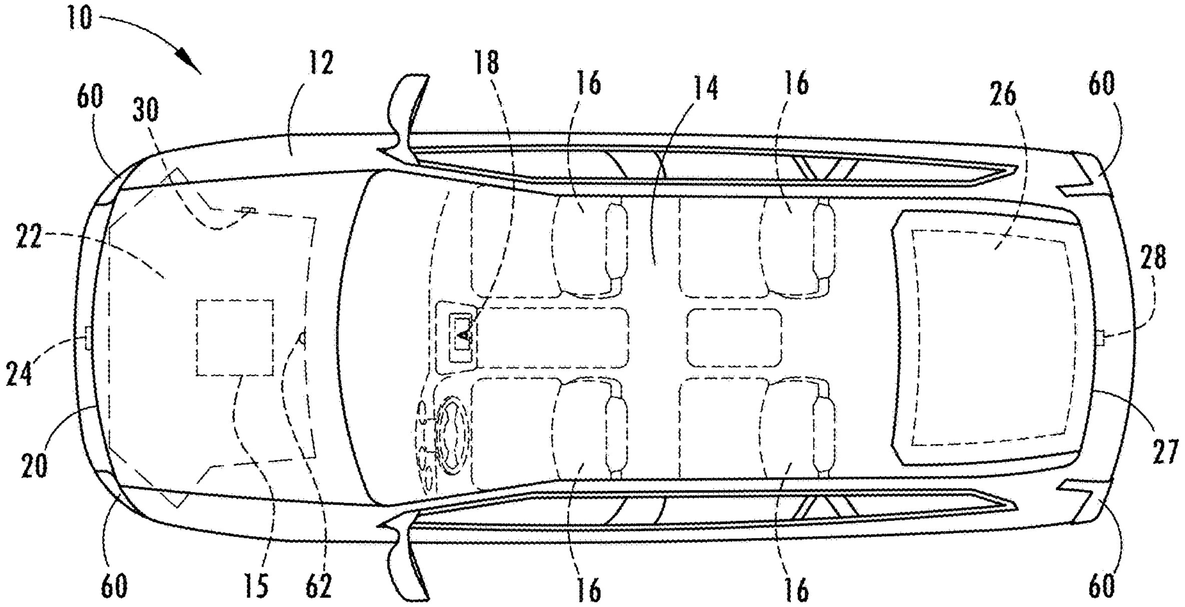
FIG. 1 is a top schematic view of a motor vehicle having front and rear storage compartments, according to one embodiment.

For purposes of description herein, the terms “upper,” “lower,” “right,” “left,” “rear,” “front,” “vertical,” “horizontal,” and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a restraint monitoring system. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term “and/or,” when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms “comprises,” “comprising,” or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by “comprises . . . a” does not, without more constraints, preclude the existence of additional identical elements in the process, method, article, or apparatus that comprises the element.

As used herein, the term “about” means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term “about” is used in describing a value or an end-point of a range, the disclosure should be understood to include the specific value or end-point referred to. Whether or not a numerical value or end-point of a range in the specification recites “about,” the numerical value or end-point of a range is intended to include two embodiments: one modified by “about,” and one not modified by “about.” It will be further understood that the end-points of each of the ranges are significant both in relation to the other end-point, and independently of the other end-point.

The terms “substantial,” “substantially,” and variations thereof as used herein are intended to note that a described feature is equal or approximately equal to a value or description. For example, a “substantially planar” surface is intended to denote a surface that is planar or approximately planar. Moreover, “substantially” is intended to denote that two values are equal or approximately equal. In some embodiments, “substantially” may denote values within about 10% of each other, such as within about 5% of each other, or within about 2% of each other.

As used herein the terms “the,” “a,” or “an,” mean “at least one,” and should not be limited to “only one” unless explicitly indicated to the contrary. Thus, for example, reference to “a component” includes embodiments having two or more such components unless the context clearly indicates otherwise.

Referring to FIGS. 1-6B, a motor vehicle 10 is generally illustrated including a storage compartment having a door panel shown as a hood panel that is movable between a closed position and an open positon allowing access to the storage compartment. The vehicle 10 further includes a user input device located within the storage compartment and a latch assembly for latching the door panel in the closed position. The latch assembly includes a first release stage in the closed position for allowing the door panel to move to an intermediate position between the open position and the closed position, and a second release stage for allowing the door panel to move to the open position. The vehicle further includes a vehicle speed sensor for sensing vehicle speed and a controller. The controller monitors the sensed vehicle speed and detects a user input to the user input device and controls the latch assembly to selectively allow the door panel to move to one of the intermediate and open positions based on the vehicle speed and user input.

As seen in FIG. 1, the vehicle 10 is shown as a motor vehicle having a vehicle body 12 and a passenger compartment 14 located within the vehicle body 12. The passenger compartment 14 includes an arrangement of seats 16 for seating one or more passengers and a display 18 that is readily viewable by one or more of the passengers, such as the driver of the vehicle. In one embodiment, the vehicle 10 may be an electric motor powered vehicle having an electric drive motor 15 shown located in the front storage compartment 22. However, the vehicle 10 may be otherwise powered such as via an internal combustion engine or other powered drive mechanism, according to other embodiments.

The vehicle 10 includes one or more storage compartments which may include the storage compartment 22 located at the front side of the vehicle 10 generally under a front door panel 20, also referred to as a hood panel, and a trunk storage compartment 26 generally located at the rear side of the vehicle and covered by a rear door panel 27, also referred to as a trunk panel. The front door panel 20 covering the front storage compartment 22 may pivot between open and closed positions about pivoting connections at the rear side of the front door panel 20 and may be latched at the front side with a latch assembly 24. The rear door panel 27 may pivot about pivoting connections at the front side of the rear door panel 27 and may be latched closed with a latch assembly 28 at the rear side. Both of the front door panel 20 and rear door panel 27 may pivot between open and closed positions and may be latched closed with the corresponding latch assemblies 24 and 28 to hold the panels in the closed position. With an electric motor vehicle, the front storage compartment 22 or the rear storage compartment 26 may include an electric driver motor 15 which typically consumes less volume than an internal combustion engine. As a result, more of the space available within the corresponding storage compartment is available for storing other items including large items.

Figure 2:
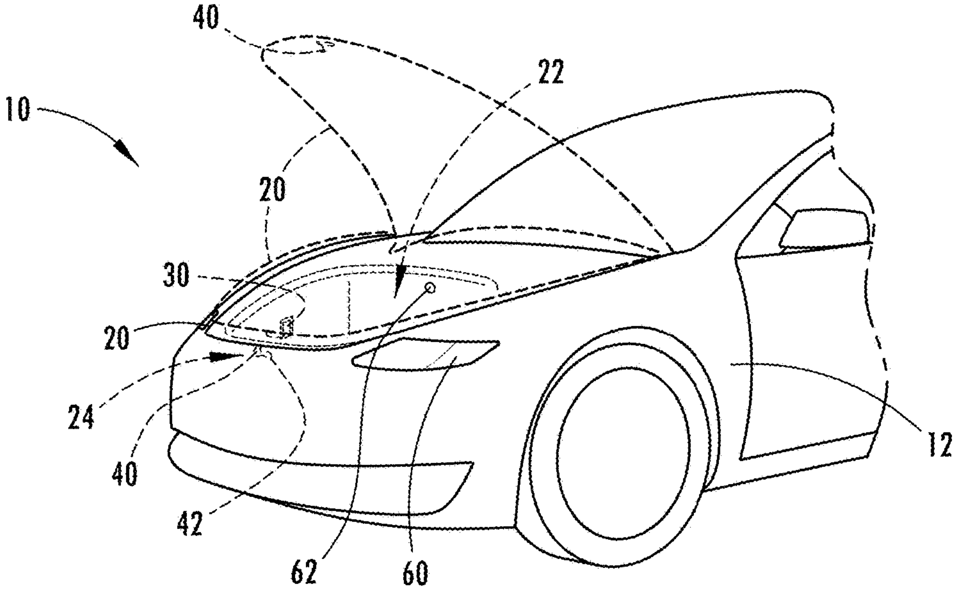
FIG. 2 is a side view of the motor vehicle showing the hood door panel in dashed lines in different positions.

As seen in FIG. 2, the front storage compartment 22 is illustrated with the front door panel 20 shown in dashed lines in both an open position tilted upright and a closed position extending approximately horizontal. When the vehicle 10 is not moving or is moving at very low speed such as less than 5 kilometers per hour, the front door panel 20 may be in the fully open position. However, when the vehicle 10 is moving at a sufficiently great enough speed such as 5 kilometers per hour in the forward direction, the front door panel 20 may be damaged due to the wind resistance and the open door panel 20 may block the forward looking view of the driver of the vehicle 10 when in the fully open position. As such, the front door panel 20 engages a two-stage latch assembly 24 that may retain the front door panel 20 in a closed door panel position when the latch assembly 24 is in a first latch position, an intermediate door panel position when the latch assembly is in a second latch position which releases the front door panel 20 but does not allow the front door panel 20 to pivot open to a greater extent, and a fully open position when the latch assembly is in a third latch position. In the intermediate position, the front door panel 20 is partially opened but is retained and prevented from moving to the fully open position. The intermediate position may allow the front door panel 20 to move a few inches, according to one example. The vehicle 10 advantageously monitors the sensed speed of the vehicle 10 and controls the latch assembly to selectively allow the hood door panel 20 to move to one of the intermediate and open positions based on the sensed vehicle speed and the user input.

Figure 3:
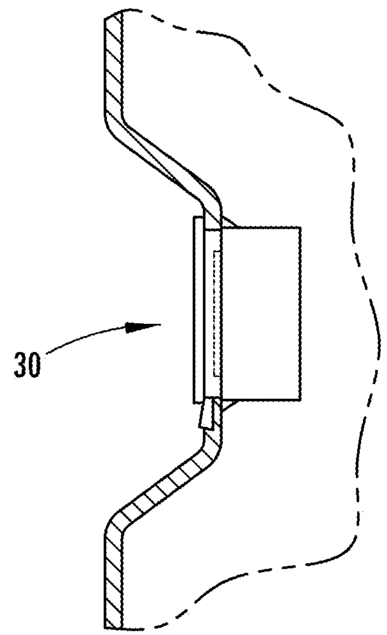
FIG. 3 is an enlarged view of section III of FIG. 2 showing a capacitive switch used as a user input device to control a latch to control latching of the hood door panel.

Referring to FIGS. 2 and 3, a user input device 30 is illustrated in the form of a manually actuatable switch located within the storage compartment 22 and accessible to a person within the storage compartment to enable the person to actuate the latch assembly 24 to open the front door panel to one of the intermediate and fully open positions, depending on the vehicle speed. The user input device 30 may include a proximity switch, such as a capacitive switch for sensing a user actuating the switch as an input command to open the front door panel 20. This may occur when a person is located and trapped within the front storage compartment 22, unbeknownst to the driver of the vehicle 10. The capacitive switch is shown recessed within a side wall of the storage space 22 to prevent inadvertent actuations such as may occur with shifting cargo and may be illuminated to allow an occupant of the storage compartment 22 to view the switch and to actuate the switch when the occupant desires to exit the storage compartment. Upon actuation of the switch, a controller detects the user input and controls the latch assembly 24 to open the hood panel 20 based on the vehicle speed and the user input as described herein.

The vehicle 10 is shown equipped with various lights including one or more cargo lights 62 for illuminating the first storage compartment 22 and hazard lights 60. The vehicle 10 may also be equipped with cameras and messaging services.

Figures 4A, 4B, 4C:
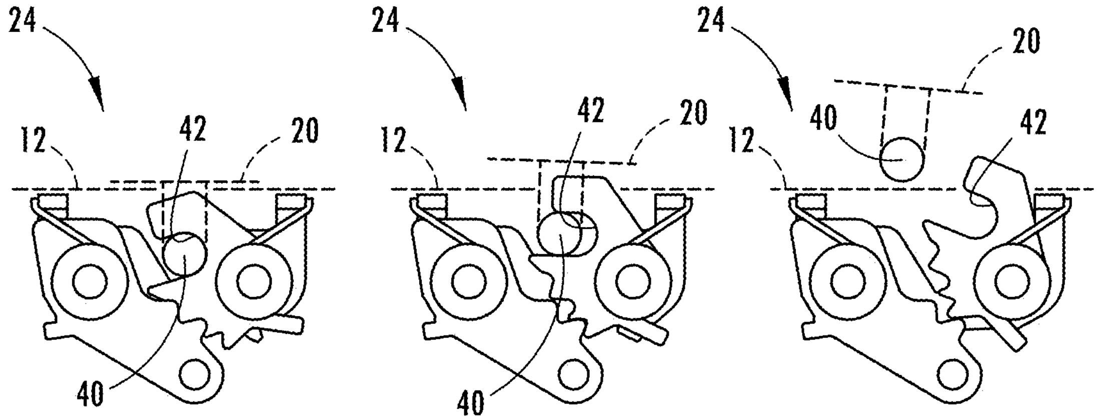
FIG. 4A is a schematic view of an electrically controlled two-stage latch for controlling latching of the hood door panel shown in a first latch position.
FIG. 4B is a schematic view of an electrically controlled two-stage latch for controlling latching of the hood door panel shown in a second latch position.
FIG. 4C is a schematic view of an electrically controlled two-stage latch for controlling latching of the hood door panel shown in a third latch position.

Referring to FIGS. 4A-4C, the two-stage latch assembly 24 is illustrated, according to one embodiment. The latch assembly 24 may be a two-stage electronically controlled latch that is electronically actuated in response to control commands from the controller. The two-stage latch in one stage fully releases the front door panel 20 to the open position in a first latch position and in another release state releases and maintains the front door panel 20 in a partially open position in an intermediate second latched position and holds the front door panel 20 in the fully closed position in a third latch position. The latch assembly 24 may include a latching mechanism that includes a pawl 42 for engaging a striker 40. The pawl 42 may be located on the vehicle body 12 and the striker 40 may be located on the front door panel 20. When the front door panel 20 is in the fully closed position, the striker 40 engages pawl 42 in a first latch position shown in FIG. 4A to lock the front door panel 20 in the closed position. Upon receiving a user input command via the user input device 30 while the vehicle 10 is in motion, the controller may control the latch assembly 24 to partially release the striker 40 from the pawl 42 to an intermediate second position which allows the hood panel 20 partially release to an intermediate position, and yet prevents the front hood panel 20 from fully opening as seen in FIG. 4B. When the vehicle speed is less than a predetermined threshold such as 5 kilometers per hour or the vehicle 10 is stopped, the pawl 42 may be controlled to release the striker 40 completely in a third position as seen in FIG. 4C to allow the front door panel 20 to open to a fully open position. In the fully open position, an occupant of the front storage compartment 22 may exit the storage compartment 22.

Figure 5:
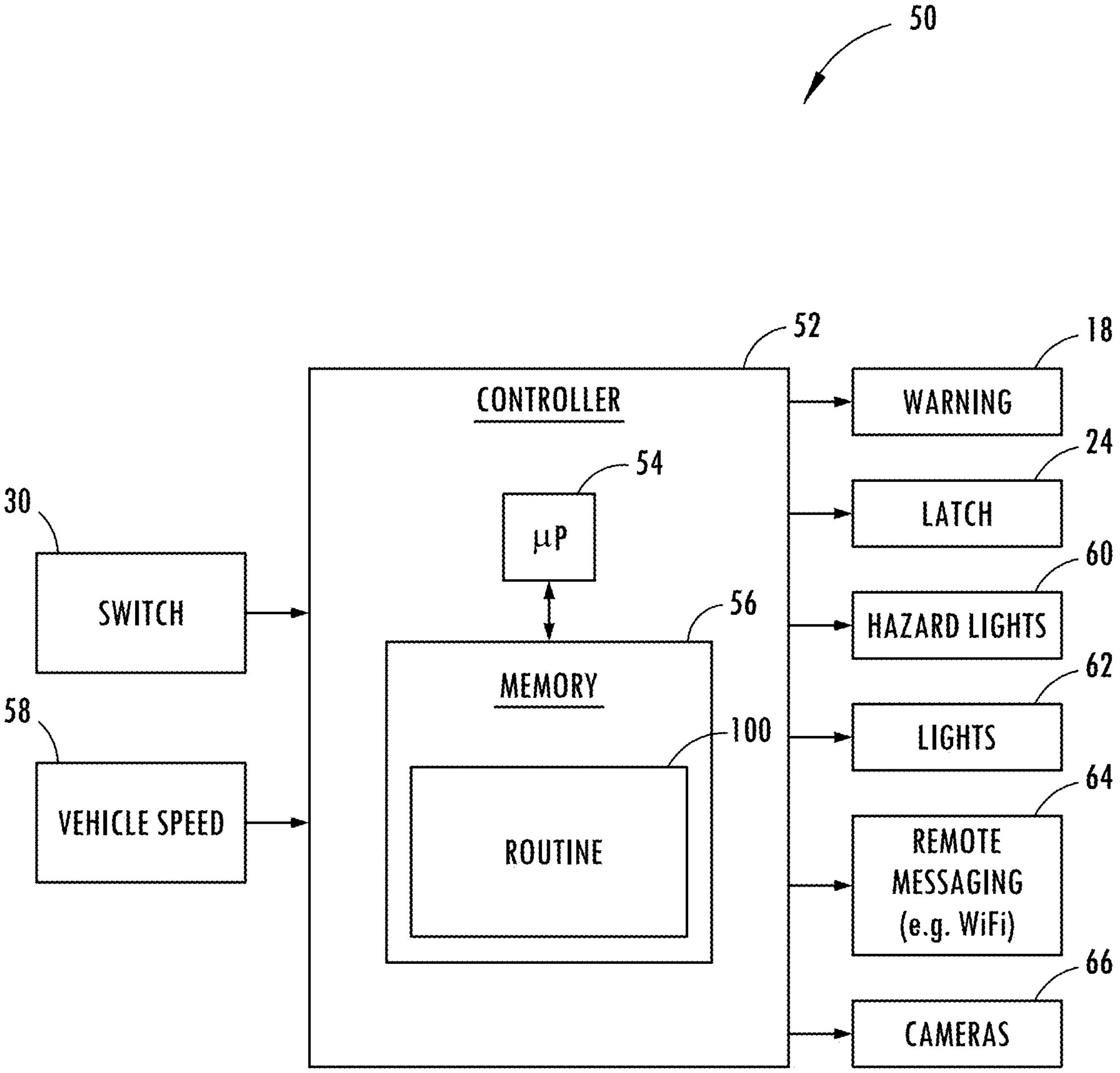
FIG. 5 is a block diagram illustrating a system for controlling the hood door panel latch based on vehicle speed and a user input.

Referring to FIG. 5, a control system 50 is illustrated having a controller 52 which includes a microprocessor 54 and memory 56 for controlling the latch assembly and controlling other functions, according to one embodiment. One or more routines 100 may be stored in memory 56 and executed by microprocessor 54. It should be appreciated that the controller 52 may include any analog and/or digital circuitry. The control system 50 includes the proximity switch user input device 30 and vehicle speed 58 as sensed from the vehicle 10 which are input to the controller 52. The controller 52 processes the switch input command and sensed vehicle speed pursuant to routine 100 and executes one or more outputs. The outputs may include providing a warning 18 such as to a visual display or a warning output on another warning device such as an audible device. The outputs also include providing an output to control the two-stage latch 24 to actuate the latch amongst the first, second and third latch positions to control the front door panel in the closed, intermediate and open positions. Additionally, the controller 52 may output signals to hazard lights 60, one or more cargo lights 62 and other lights and provide remote messaging 64, such as via WIFI or other messaging services. The control system 50 may further control various vehicle cameras 66 such as exterior 360 degree camera(s) and interior cameras such as one or more cameras in the storage compartment.

Figure 6A:
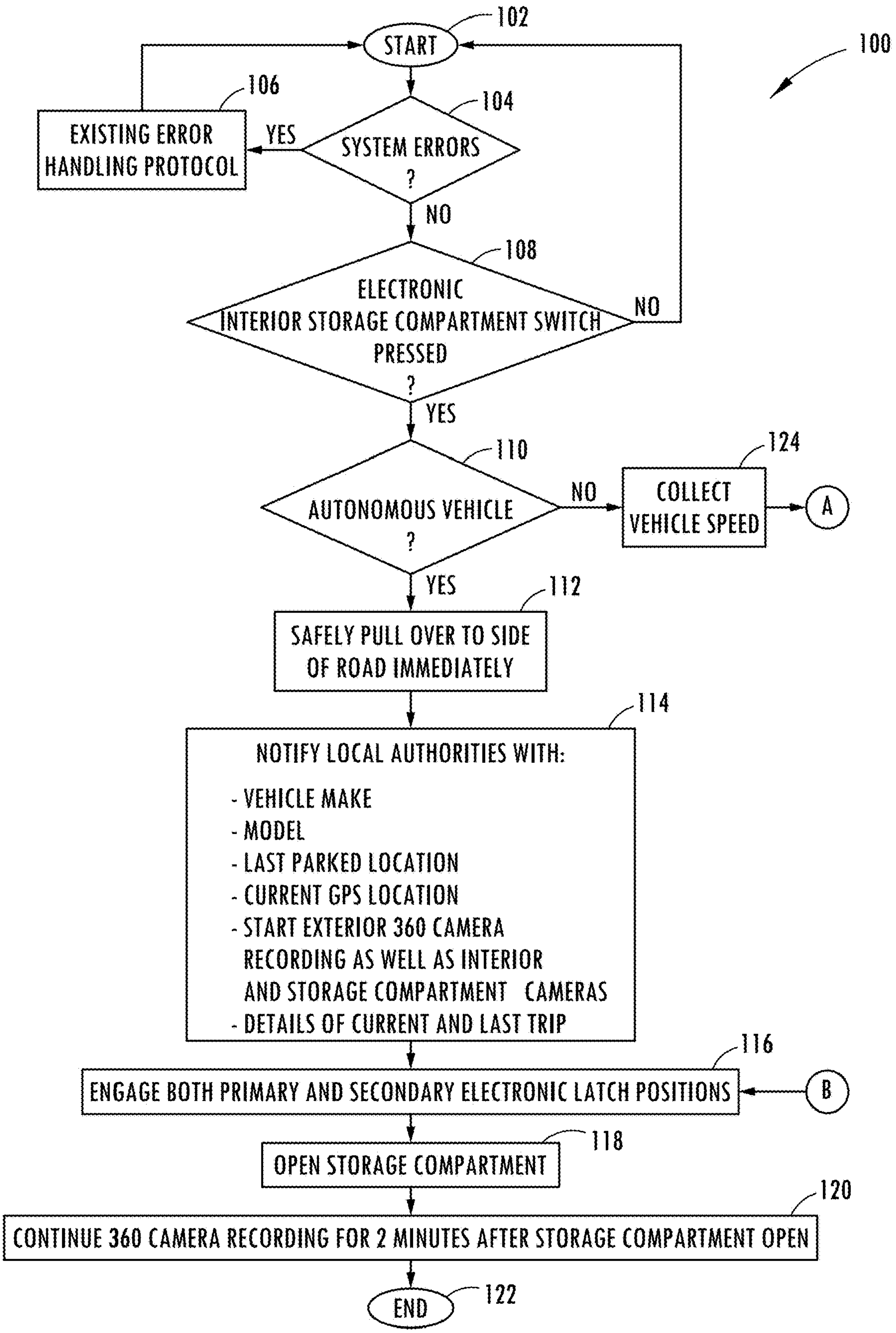
FIGS. 6A and 6B are a flow diagram illustrating a routine for controlling the hood door panel latch, according to one embodiment.
Figure 6B:
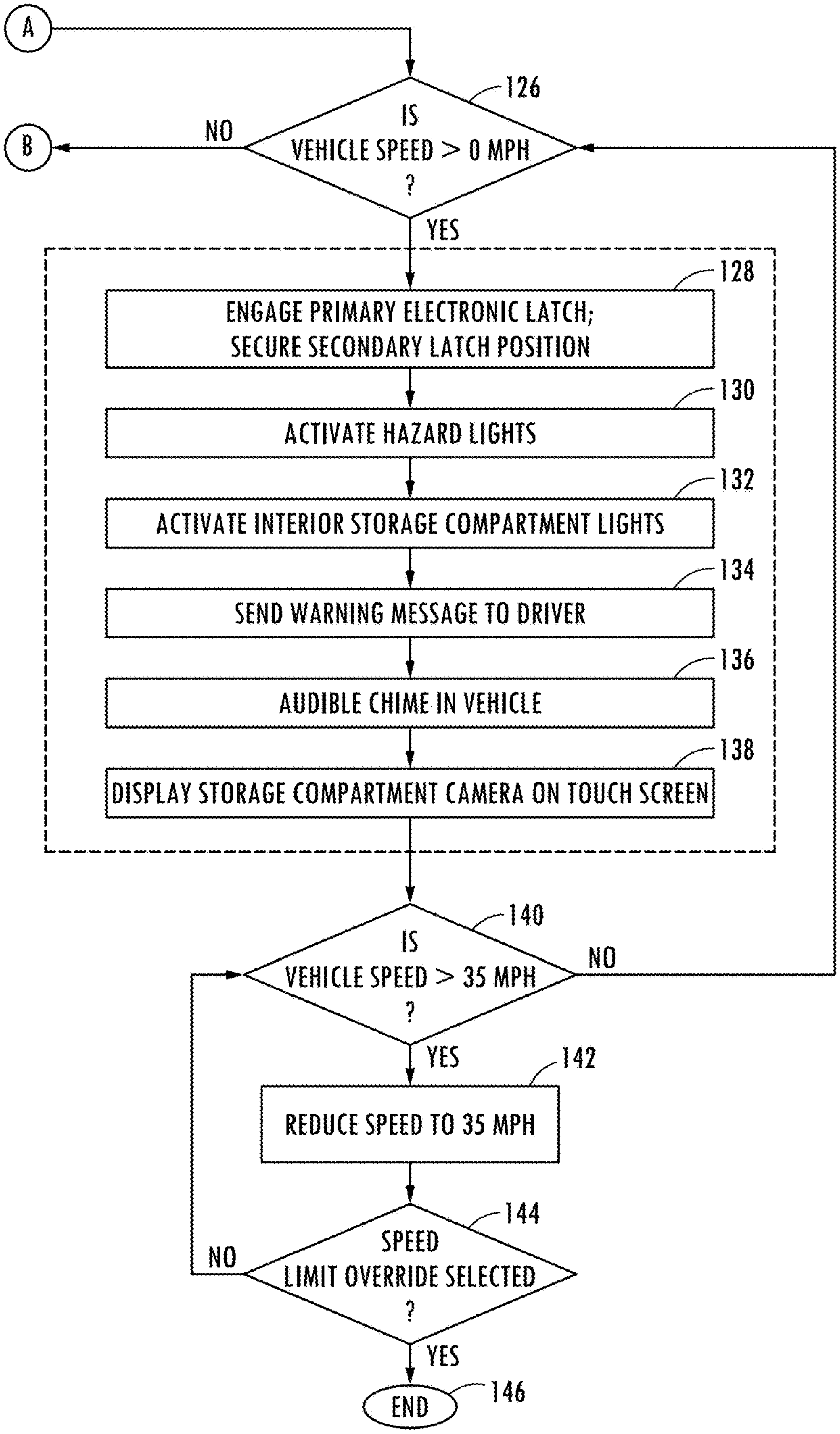

Referring to FIGS. 6A and 6B, the routine 100 for controlling the front door panel for the vehicle storage compartment as executed by the control system is illustrated, according to one embodiment. Routine 100 begins at step 102 and proceeds to decision step 104 to determine if there are any existing system errors and, if so, proceeds to step 106 to execute an error handling protocol, and then returns to step 102. Provided there are no system errors detected, routine 100 proceeds to decision step 108 to determine if the user input device in the form of an electronic interior storage compartment switch has been pressed by a user in the storage compartment and, if not, returns to start.

If the interior storage compartment switch has been pressed, routine 100 proceeds to decision step 110 to determine if the vehicle is an autonomous vehicle and operating in an autonomous driving mode and, if so, proceeds to step 112 to safely slow down and steer the vehicle to the side of the roadway immediately. Thereafter, routine 100 may notify local authorities with information such as vehicle make, model, last parked location, current global positioning system (GPS) location, and may activate an exterior 360° camera, record the exterior camera as well as one or more interior and storage compartment cameras, and provide details of current and last travel trips in step 114. Next, at step 116, routine 100 will engage both the primary and secondary electronic latch positions and will then open the storage compartment by fully releasing the door panel to the open position at step 118. Next, at step 120, routine 100 will continue with the 360° camera recording for a time period such as two minutes after the door panel has been opened before ending at step 122.

If the vehicle is determined not to be an autonomous vehicle or not operating in an autonomous mode, routine 100 proceeds to step 124 to collect sensed vehicle speed. The sensed vehicle speed may be collected from one or more speed sensors on the vehicle. Thereafter, routine 100 proceeds to decision step 126 to determine if the vehicle speed is greater than 0 mph, indicative of the vehicle moving. If the vehicle is not moving, routine 100 returns to step 116. If the vehicle is determined to be moving, routine 100 proceeds to step 128 to engage the primary electronic latch and to secure the secondary (intermediate) latch position. Next, at step 130, routine 100 activates the hazard lights, and proceeds to step 132 to activate the interior storage compartment lights, and to step 134 to sends a warning message to the driver, and to step 136 to provide an audible chime in the vehicle. Additionally, at step 138, routine 100 may display the trunk camera on the touchscreen display.

Following step 138, routine 100 proceeds to decision step 140 to determine if the vehicle speed is greater than 35 mph and, if not, returns to decision step 126. If the vehicle exceeds a predetermined speed, such as 35 mph, routine 100 proceeds to step 142 to control the vehicle to reduce the speed of the vehicle to a maximum speed of 35 mph, and then to decision step 144 to determine if the speed limit override has been selected. If the speed limit override has not been selected, routine 100 returns to step 140. If the speed limit override has been selected, routine 100 ends at step 146.

Accordingly, the vehicle 10 advantageously employs a user input device such as a switch and a vehicle speed input to control the latch to open a door panel on a storage compartment of the vehicle based on the vehicle speed. This advantageously provides for the ability to allow for a person trapped within a storage compartment of the vehicle to exit the vehicle storage compartment in an effective manner.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:

a storage compartment having a door panel that is movable between a closed position and an open position allowing access to the storage compartment;

a user input device comprising a manually actuatable electronic switch located within the storage compartment;

a latch assembly for latching the door panel in the closed position, wherein the latch assembly includes a first release stage for allowing the door panel to move to an intermediate position between the open position and closed position and a second release stage for allowing the door panel to move to the open position;

a vehicle speed sensor for sensing vehicle speed;

a controller monitoring vehicle speed and detecting a user input manually actuating the user input device from within the storage compartment and controlling the latch assembly to selectively allow the door panel to move to one of the intermediate and open positions based on the sensed vehicle speed and the detected manual user input; and hazard lights, wherein the hazard lights are activated when the user input device is manually actuated and the vehicle speed exceeds a threshold speed.

2. The vehicle of claim 1, wherein the manually actuatable electronic switch comprises a capacitive switch.

3. The vehicle of claim 1, wherein the latch assembly comprises a two-stage latch that is electronically controlled by the controller.

4. The vehicle of claim 3, wherein the two-stage latch fully releases the door panel to the open position in a first latch position and releases and maintains the door panel in the intermediate position in an intermediate second latch position and holds the door panel in the closed position in a third latch position.

5. The vehicle of claim 1, wherein the storage compartment is located on a front side of the vehicle.

6. The vehicle of claim 1, wherein the vehicle comprises an electric vehicle.

7. The vehicle of claim 1 further comprising a device for providing a warning to a driver of the vehicle when the user input device is manually actuated.

8. The vehicle of claim 1, wherein the door panel comprises a hood panel on a front side of the vehicle.

9. A vehicle comprising:
- a storage compartment having a hood panel, located on a front side of the vehicle, that is movable between a closed position and an open position allowing access to the storage compartment;
- a user input device comprising a manually actuatable electronic switch located within the storage compartment;
- a latch assembly for latching the hood panel in the closed position, wherein the latch assembly includes a first release stage for allowing the hood panel to move to an intermediate position between the open position and closed position and a second release stage for allowing the hood panel to move to the open position;
- a vehicle speed sensor for sensing vehicle speed;
- a controller monitoring vehicle speed and detecting a user input manually actuating the user input device from within the storage compartment activating and controlling the latch assembly to selectively allow the hood panel to move to one of the intermediate and open positions based on the sensed vehicle speed and the detected manual user input;
- an imaging device in the storage compartment; and
- a display, wherein the display displays images captured by the imaging device when the user input device is manually actuated.

10. The vehicle of claim 9, wherein the manually actuatable electronic switch comprises a capacitive switch.

11. The vehicle of claim 9, wherein the latch assembly comprises a two-stage latch that is electronically controlled by the controller.

12. The vehicle of claim 11, wherein the two-stage latch fully releases the hood panel to the open position in a first latch position and releases and maintains the hood panel in the intermediate position in an intermediate second latch position and holds the hood panel in the closed position in a third latch position.

13. The vehicle of claim 9, wherein the storage compartment is located on the front side of the vehicle.

14. The vehicle of claim 9, wherein the vehicle comprises an electric vehicle.

15. The vehicle of claim 9 further comprising a device for providing a warning to a driver of the vehicle when the user input device is manually actuated.

16. A method of controlling a vehicle and a door panel for a storage compartment on the vehicle, the door panel being movable between a closed position and an open position allowing access to the storage compartment, the method comprising:
- detecting a user input manually actuating a user input device comprising a manually actuatable electronic switch located within the storage compartment;
- latching the door panel in the closed position with a latch, wherein the latch includes a first release state for allowing the door panel to move to an intermediate position between the open position and the closed position and a second release stage for allowing the door panel to move to the open position;
- sensing vehicle speed with a vehicle speed sensor;
- controlling the latch to selectively allow the door panel to move to one of the intermediate and open positions based on the sensed vehicle speed and the detected manual user input from within the storage compartment; and
- controlling the vehicle to reduce the vehicle speed when the user input device is manually actuated and the vehicle speed exceeds a threshold speed.

17. The method of claim 16, wherein the storage compartment is located at a front of the vehicle and the door panel is a hood panel.

18. The method of claim 16, wherein the vehicle comprises an electric vehicle.

* * * * *